(12) United States Patent
Kutzner

(10) Patent No.: US 6,877,268 B2
(45) Date of Patent: Apr. 12, 2005

(54) CHUMPOT

(76) Inventor: William R. Kutzner, 22 Wynsum Ave., Merrick, NY (US) 11566

( * ) Notice: Subject to any disclaimer, the term of this patent is extended or adjusted under 35 U.S.C. 154(b) by 0 days.

(21) Appl. No.: 10/618,805

(22) Filed: Jul. 14, 2003

(65) Prior Publication Data

US 2004/0093787 A1 May 20, 2004

Related U.S. Application Data

(63) Continuation-in-part of application No. 10/142,559, filed on May 9, 2002, now abandoned.

(51) Int. Cl.$^7$ ............................................. A01K 91/00
(52) U.S. Cl. ........................................ 43/44.89; 43/55
(58) Field of Search .......................... 43/44.89, 65, 56, 43/55, 44.99

(56) References Cited

U.S. PATENT DOCUMENTS

| | | | |
|---|---|---|---|
| 2,612,718 A | | 10/1952 | Steinberg |
| 2,614,358 A | | 10/1952 | Adams |
| 2,709,317 A | * | 5/1955 | Pease, Sr. .................. 43/44.99 |
| 2,713,744 A | | 7/1955 | Strausser |
| 2,719,382 A | * | 10/1955 | Schachte .................. 43/44.99 |
| 2,729,912 A | | 1/1956 | Moffett |
| 2,731,908 A | * | 1/1956 | Morena ....................... 99/414 |
| 2,765,575 A | | 10/1956 | Grroerer |
| 2,797,517 A | | 7/1957 | Ericksen |
| 2,928,202 A | | 3/1960 | Smerke |
| 2,979,853 A | * | 4/1961 | Erickson .................... 43/44.99 |
| 3,084,471 A | | 4/1963 | Alspaugh |
| 3,163,959 A | | 1/1965 | Hollar |
| 4,017,999 A | | 4/1977 | Muko |
| 4,138,794 A | * | 2/1979 | Chiodini .................... 43/43.14 |
| 4,254,093 A | * | 3/1981 | Faria et al. .............. 423/566.1 |
| 4,621,447 A | | 11/1986 | Rhodes |
| 4,735,337 A | | 4/1988 | Von Holdt |
| 4,829,705 A | | 5/1989 | Dorsey |
| 5,107,617 A | | 4/1992 | Pendleton |
| 5,617,669 A | * | 4/1997 | Levey ....................... 43/44.99 |
| 5,651,209 A | * | 7/1997 | Rainey ....................... 43/17.5 |
| 5,913,672 A | | 6/1999 | Nicholson |
| 6,138,400 A | | 10/2000 | Gervae |
| 6,499,619 B1 | | 12/2002 | Snow |
| 6,530,171 B2 | * | 3/2003 | Stevens et al. ............ 43/44.99 |

FOREIGN PATENT DOCUMENTS

GB    2186171 A    8/1987

OTHER PUBLICATIONS

Skimmer Outdoors, Fishing Tips 2001, www.skimmeroutdoors.com/tips/tips99.htm, pp. 1–18.
Rodale's Scuba Diving the magazine divers trust, www.scubadiving.com/members/gearreviews.php?s=317.

* cited by examiner

Primary Examiner—Kurt Rowan
Assistant Examiner—Bethany L. Griles
(74) Attorney, Agent, or Firm—Scully, Scott, Murphy & Presser

(57) ABSTRACT

A chum delivery container, or chumpot, which includes a base and a surrounding wall surface. The base and the surrounding wall surface define an open interior chamber and an open upper surface. The surrounding wall surface includes a plurality of perforations permitting release of the chum. An anchoring fixture is disposed at the base of the open interior chamber. A rope line for lowering the chum delivery container to an underlying surface is connected to the anchoring fixture. The open upper surface of the containment member can be sealed or unsealed and the rope line penetrates through the seal. A portion of the seal can be of a curvilinear shape and the seal can include locking tabs to facilitate removal of the seal from the container. The container includes a weighting material disposed at the base, and the container can be made of a luminescent material.

20 Claims, 9 Drawing Sheets

CHUMPOT

CROSS REFERENCE TO RELATED APPLICATION

This application is a continuation-in-part of U.S. patent application Ser. No. 10/142,559 filed on May 9, 2002 now abandoned.

BACKGROUND OF THE INVENTION

1. Field of the Invention

The present invention relates to a chum delivery container, or chumpot, for delivering chum or bait in a controlled manner below the surface of the water to attract fish, and more specifically to a chum delivery container which is made of a luminescent material to multiply the attraction effects and that is of simple and inexpensive construction which permits rapid and controlled cleaning and restocking of the container under nearly all weather conditions and which includes a rigid weighting arrangement made of an environmentally compatible material.

2. Description of the Related Art

Chum delivery containers are well known in the art of sport fishing. Such containers typically are designed to automatically dispense the chum or bait either as the container moves in the water or by the natural water currents near the bottom of the water or when impacted by a fish or actually triggered by the fisherman. One of the more recent examples is U.S. Pat. No. 4,829,705 issued May 16, 1989 to Dorsey which discloses a pair of perforated frusto-conically shaped sections that are joined together at their larger ends and having a weight in the in the lower end to impose a vertical position. A door is provided in the upper section for access.

Another recent example is U.S. Pat. No. 5,913,672 issued Jun. 22, 1999 to Nicholson which is a chum delivery assembly that includes a perforated container with a bottom panel. The container can be raised while on the water bottom to permit the chum that is positioned on the bottom panel to be exposed in a concentrated manner so as to attract larger types of gaming fish that would might otherwise be wary of approaching the area of the container.

A third recent example is U.S. Pat. No. 5,617,669, issued Apr. 8, 1997 to Levey which is a perforated container comprised of a pair of longitudinally divided cylinder halves molded with a hinge running the entire length of the container. Weight-receiving pockets are molded integrally into the lower half of the cylinder.

The problems with the prior art devices are that generally they do not provide for delivering chum or bait in a controlled manner below the surface of the water to attract fish, and are not made of a luminescent material to multiply the attraction effects. Furthermore, the prior art devices generally are not of simple and inexpensive construction that includes a rigid, environmentally compatible weighting arrangement and at the same time are not designed to permit rapid and controlled cleaning and restocking of the container under weather conditions suitable for sport fishing.

SUMMARY OF THE INVENTION

The present invention is directed to a chum delivery container, or perforated chum pot, which delivers chum or bait in a controlled manner below the surface of the water to attract fish, and which is made of a luminescent material to multiply the attraction effects, and that is of simple and inexpensive construction to permit rapid and controlled cleaning and restocking of the container under weather conditions suitable for sport fishing and includes a rigid weighting arrangement made of an environmentally compatible material.

The chum delivery container of the present invention comprises a containment member, the containment member including a base and a surrounding wall surface, the base and the surrounding wall surface therein defining an open interior chamber and an open upper surface. The surrounding wall surface includes a plurality of perforations therein permitting release of the chum from the open interior chamber. Anchoring means are disposed at the base within the open interior chamber. Lowering means are provided for lowering the chum delivery container to an underlying surface at a location, and sealing and unsealing means are provided for sealing and unsealing the open upper surface of the containment member. At least a portion of the sealing and unsealing means can be of a curvilinear shape and can be comprised of a plurality of perforations. The sealing and unsealing means can further comprise at least one locking tab or spacer section which permits outward folding of the tab to seal and unseal the sealing means to and from the open upper surface of the containment member. The lowering means for lowering the chum delivery container is operatively connected to the anchoring means, and the lowering means penetrates through the sealing and unsealing means.

The lowering means further comprises a locking means for locking in position the sealing means for sealing the open upper surface of the containment member, the locking means permitting both sealing and unsealing of the containment member. The lowering means further comprises a limiting means for limiting travel of the sealing and unsealing means along the lowering means. The locking means is capable of movement on, or travel along, the lowering means and is capable of being unlocked in a single action.

Typically, the containment member further comprises a weighting material disposed at the base, typically a concrete containing Portland cement. The containment member and the sealing and unsealing means are comprised of a plastic material, typically a high-density polyethylene with a luminescent material, such as phosphorescent cadmium-zinc sulfide. Typically, the containment member is substantially cylindrical.

In one embodiment, the anchoring means, except for a portion at which the lowering means for lowering the chum delivery container is operatively connected to the anchoring means disposed at the base, is contained within the weighting means. In another embodiment, the anchoring means is at least partially surrounded by the weighting material, and the anchoring means is substantially exposed to the interior region of the containment member.

These and other objects, features and advantages of the present invention will become more readily apparent from the drawings and the detailed description of exemplary embodiments, which follows.

DETAILED DESCRIPTION OF EXEMPLARY EMBODIMENTS

The present invention generally comprises a chum delivery container, or chum pot, which is perforated to provide a controlled release of chum or bait below the surface of the water to attract fish. The chum pot is made of a plastic material. The plastic material includes a light-emitting luminescent material, capable of being activated under darkness by a lighting source, to multiply the attraction effects, even during night fishing. The chum pot includes a rope line connected at the base to a rigid weighting arrangement made of an environmentally compatible material. The rope line controls the movement of the lid of the chum pot to facilitate both secure closure while the chum pot is submerged and also to facilitate quick and easy restocking of the chum pot even during difficult weather conditions such as wind, rain or snow. The chum pot is made of simple and inexpensive construction that permits rapid and controlled cleaning and restocking.

Figure 1:
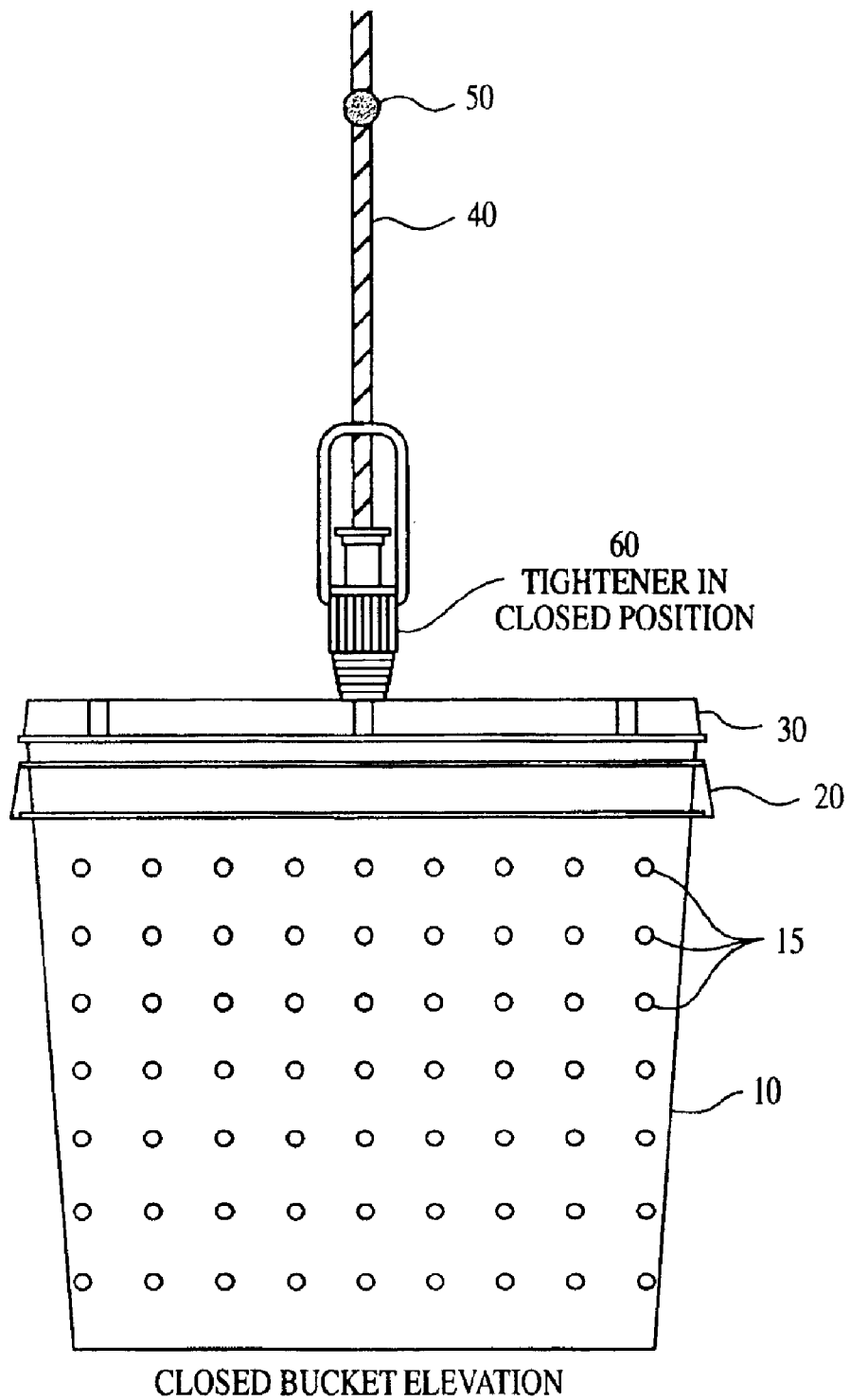
FIG. 1 is an elevation view of the chum pot of the present invention in the closed position.

FIG. 1 illustrates a side elevation view of the present chum dispensing container, or chum pot, which is generally designated by the reference numeral 100. The chum pot 100 comprises a bucket 10 which has a series of perforations 15 which are provided for the release of the chum or bait while the chum pot 100 is submerged under the water. The chum is released in a controlled manner by the underwater currents. Typically the bucket 10 is nearly cylindrical in shape, although other configurations can be used within the scope of the present invention. The bucket 10 typically includes a rim 20 which provides a mating surface for a bucket lid 30, so as to permit sealing and unsealing of the bucket 10. The lid 30 is shown in a sealed (closed) position with respect to the bucket 10. A lowering line 40, typically a rope line, is provided which includes a knot or loop clasp or other fastening device 50 or other limiting means for limiting the travel of the lid 30 for sealing and unsealing the bucket 10. The lowering line 40 is further provided with a locking device, tightener 60, which prevents undesired release of the lid 30 from the bucket rim 20. The tightener 60 is typically a quick release device which is commercially available as Model No. 7097 from the Lehigh Group of Allentown, Pa., USA. The quick release device typically is capable of being unlocked in a single action. The single action is typically, but not limited to, a manual action by the user. The action can be performed by power-operated means if desired. To significantly enhance the effectiveness of the chum pot 100 as a fish lure, at least one of the bucket 10, rim 20, and lid 30, and preferably each, is made of a plastic material such as high-density polyethylene which further includes typically a re-chargeable, re-usable, long-term luminescent (phosphorescent) material such as cadmium-zinc sulfide. Luminescent properties are thus imparted to the bucket 10 or the rim 20 or the lid 30, or any combination thereof, by light to which the former are exposed before the chum pot 100 is submerged under the water. The luminescent properties can be made to last for several hours, as desired based on the intended usage of the chum pot 100 and are renewable every time the chum pot 100 is again exposed to light either above or below the water. Those skilled in the art will recognize that the term luminescent as used herein includes both long-term light emitting properties as exhibited by phosphorescent materials and also short-term light emitting properties as exhibited by fluorescent materials when an external light source is removed.

Figure 2:
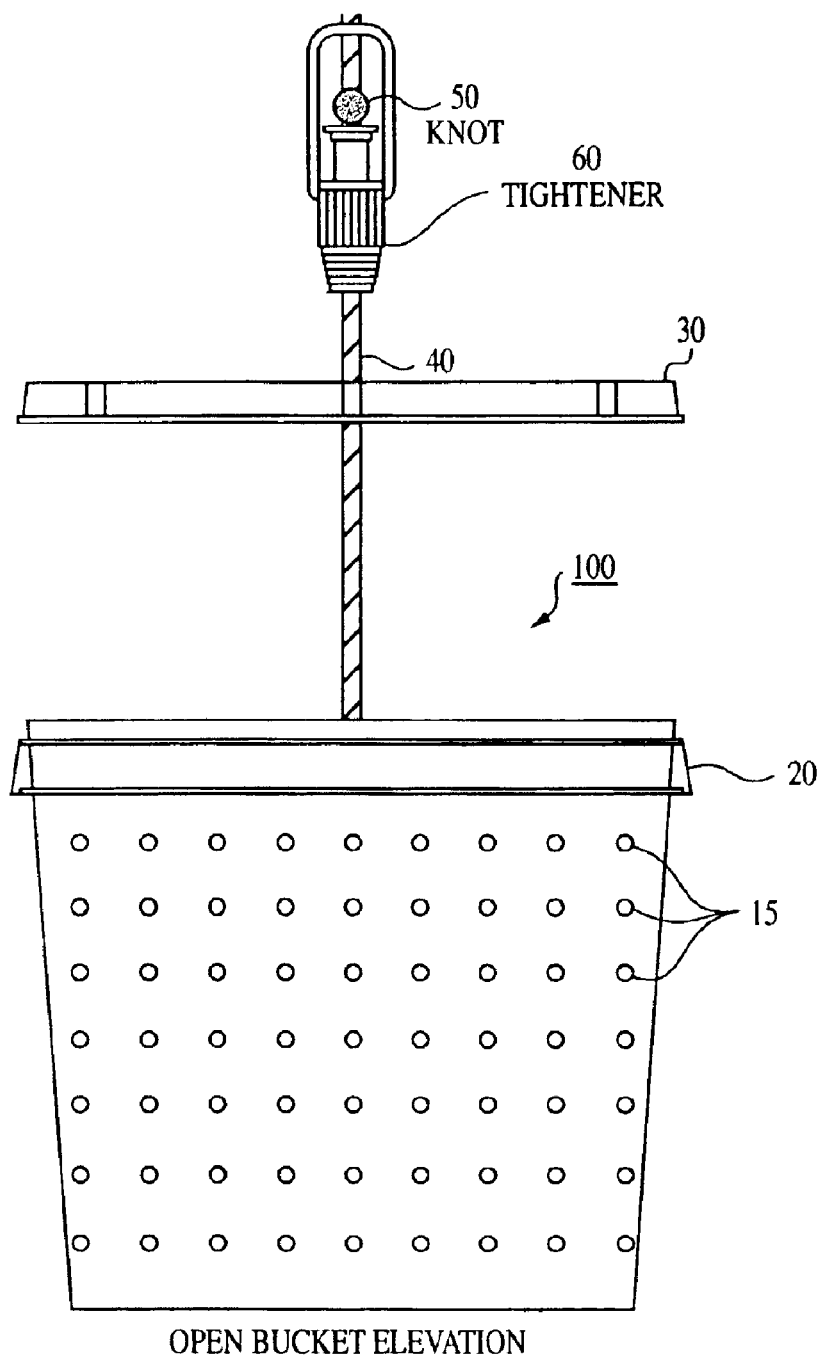
FIG. 2 is an elevation view of the chum pot of the present invention in the open position.

FIG. 2 illustrates a side elevation view of the present chum dispensing container, or chum pot, 100 with the lid 30 in the unsealed (open) position. The travel or movement of the quick release tightener 60 and the lid 30 on the line 40 is limited by the knot or loop clasp or other fastening device 50. In the open position, the lowering line 40 facilitates user control over the lid 30 even during windy or rainy or snowy conditions suitable for sport fishing. The quick release feature of the tightener 60 permits the user to quickly raise the lid 30 and replenish the supply of chum or bait inside the chum pot 100. Once this is accomplished, the user can simply reposition and seal the lid 30 back over the rim 20.

Figure 3:
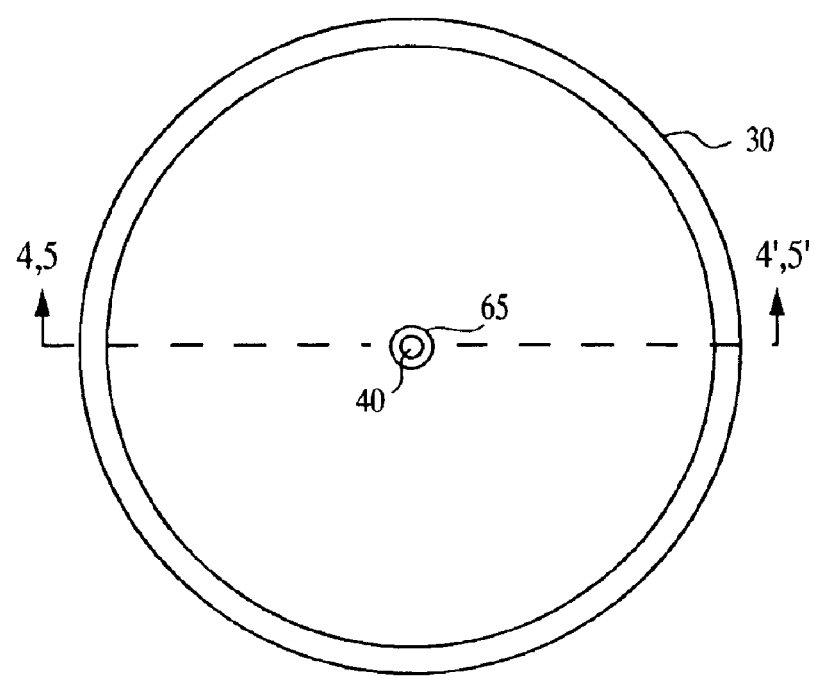
FIG. 3 is a plan view of the chum pot of the present invention.

FIG. 3 illustrates a plan view of the chum pot 100. Preferably at the center of the lid 30 is positioned a sleeve 65 through which the lowering line 40 passes. The sleeve 65 prevents lateral motion and reduces degradation of the lowering line 40 and also reduces the frictional resistance as the lid 30 is raised and lowered on the lowering line 40.

Figure 4:
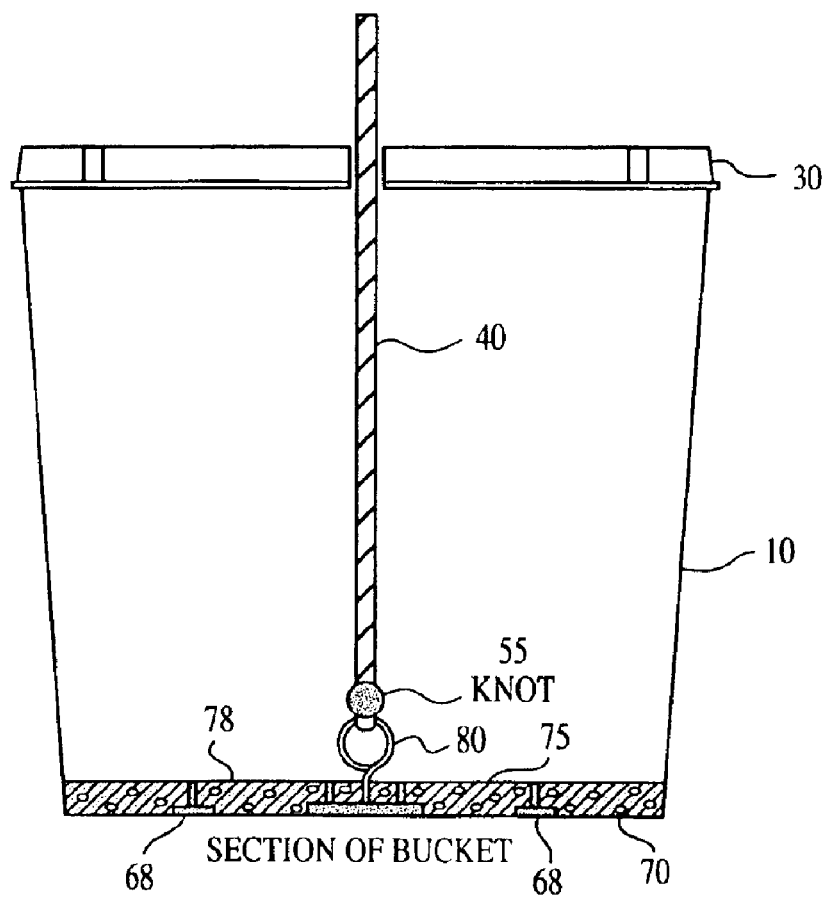
FIG. 4 is a cross-sectional view of the present invention along section 4-4' of FIG. 3.

FIG. 4 illustrates a cross-sectional view of the chum pot 100 along section line 4–4' of FIG. 3. Anchor bolts 68 are positioned through the lower surface 70 of the bucket 10 into a weighting material 75 which preferably is provided and is positioned at least partially if not entirely over eye-bolt anchor 80. The weighting material 75 holds the eye-bolt anchor 80 in place in a rigid manner. The weighting material 75 is typically an environmentally safe concrete containing Portland cement that is sold commercially under the trade name Top'n Bond® by American Stone-Mix, Inc. of Towson, Md., USA. The line 40 is fastened to the eye of the eye-bolt anchor 80 by a second knot or loop clasp or other fastening device 55 so that the eye-bolt anchor 80 acts as an anchoring point for the line 40. When in use, the chum or bait is placed on the upper surface 78 of the weighting material 75 for dispersal through the perforations 15 in FIG. 1 and FIG. 2.

Figure 5:
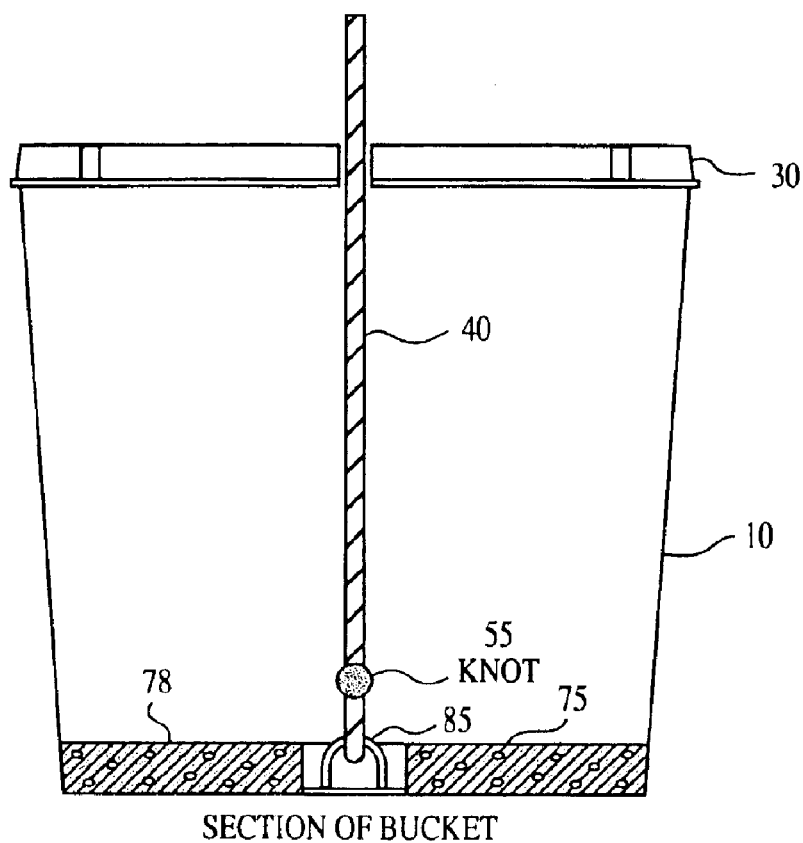
FIG. 5 is a cross-sectional view of an alternate embodiment of the present invention along section 5–5' of FIG. 3.

FIG. 5 illustrates a cross-sectional view of an alternate embodiment of the chum pot 100 along section line 5–5' of FIG. 3. In this embodiment, the weighting material 75 is preferably provided and is positioned at least partially if not entirely around the U-bolt anchor 85. The line 40 is fixed to the U-bolt of the U-bolt anchor 85 by the second knot or loop clasp or other fastening device 55 so that the U-bolt anchor 85 acts as an anchor point for the line 40. As is the case of FIG. 4, when in use, the chum or bait is placed on the upper surface 78 of the weighting material 75 for dispersal through the perforations 15 in FIG. 1 and FIG. 2. The weighting material 75 surrounds the U-bolt anchor 85 in place to maintain a rigid position for the U-bolt anchor 85. Again, the weighting material 75 is typically an environmentally compatible concrete that is sold commercially as described previously.

Figure 6:
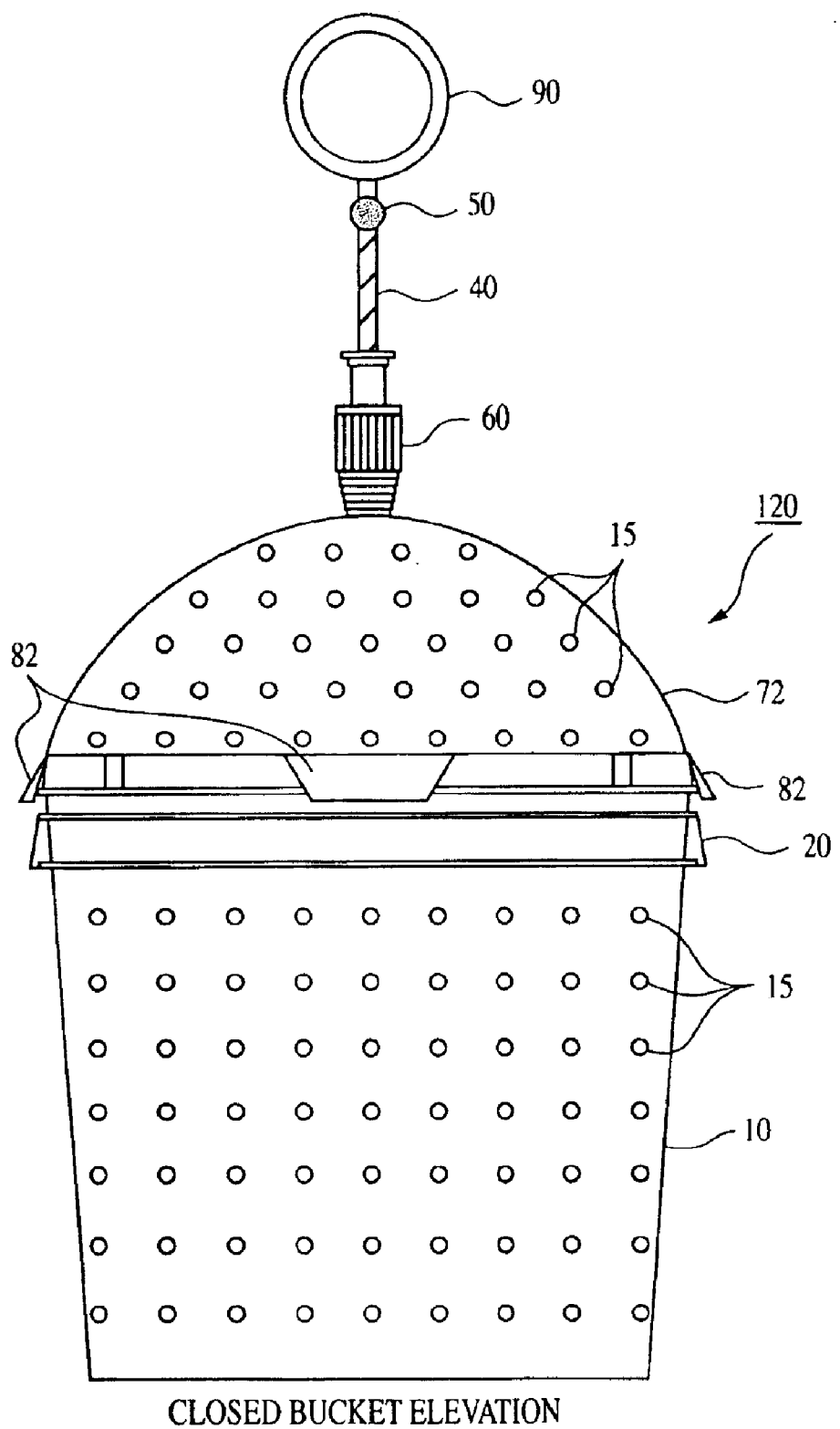
FIG. 6 is an elevation view of another embodiment of the present invention.

FIG. 6 is an elevation view of another embodiment of the present invention in the closed position. The chum pot 120 comprises the bucket 10 with perforations 15 which are again provided for the release of chum or bait while the chum pot 120 is submerged under the water. The bucket 10 with rim 20 and perforations 15 are typically the same as for the first embodiment of FIG. 1. In this embodiment, a curvilinear lid 70, typically dome-shaped, mates with the rim 20 of the bucket 10 in the closed position. The lid 72 also contains perforations 15. The lid 72 can be mated to the rim 20 typically in the same manner as illustrated in FIG. 1 to permit sealing and unsealing of the bucket 10. Typically, the lid 72 is configured to provide a single interior compartment volume or chamber when joined to the bucket 10. However, if desired, the lid 72 can be configured to provide two or more interior compartment volumes when joined to the bucket 10. The lowering line 40, as for the embodiment of FIG. 1, penetrates through the top of the lid 72 and permits the lid 72 to move on or travel along the lowering line 40. Similarly, the locking device or tightener 60 is provided to minimize undesired separation of the lid 72 from the bucket 10. The knot or loop clasp or other fastening device 50 can be provided as before on the lowering line 40 to limit travel of the lid 72. In addition, optional locking tabs or spacer sections 82 can be provided to secure the lid 72 to the rim 20. The locking tabs or spacer sections 82 can either be the primary means of sealing the lid 72 to the rim 20 or can supplement the mating of the lid 72 to the rim 20. The locking tabs or spacer sections 82 can be formed by means of a break-away flange portion (not shown) so as to permit outward folding of the tabs 82 to release the lid 72 from the rim 20, as disclosed in U.S. Pat. No. 4,735,337 issued to Von Holdt. An optional ring 90 can be coupled to the lowering line 40 to enhance the capability of moving of the chum pot 120 by a boat or other means, such as by a user manually moving the chum pot 120 up and down to stir up the chum for release through the perforations. Typically, the chum pot is only filled with chum to a level to enable circulation of the water to expel the chum from the perforations. This is typically at the rim level. The curvilinear shape of the lid 72 reduces the frictional drag of the chum pot 120 while being moved, particularly under water. Those skilled in the art recognize that, although not shown in FIGS. 1 through 5, the ring 90 can be provided to the lowering line 40 for the previously described embodiments in the same manner as shown in FIG. 6.

As before, the quick release device 60 typically is capable of being unlocked in a single action. The single action is typically, but not limited to, a manual action by the user. The action can be performed by power-operated means if desired. Again to significantly enhance the effectiveness of the chum pot 120 as a fish lure, at least one of the bucket 10, rim 20, and lid 72, and preferably each, is made of a plastic material such as high-density polyethylene which further includes typically a re-chargeable, re-usable, long-term luminescent (phosphorescent) material such as cadmium-zinc sulfide. Luminescent properties are thus imparted to the bucket 10 or the rim 20 or the lid 72, or any combination thereof, by light to which the former are exposed before the chum pot 120 is submerged under the water. The luminescent properties can be made to last for several hours, as desired based on the intended usage of the chum pot 120 and are renewable every time the chum pot 120 is again exposed to light either above or below the water.

Figure 7:
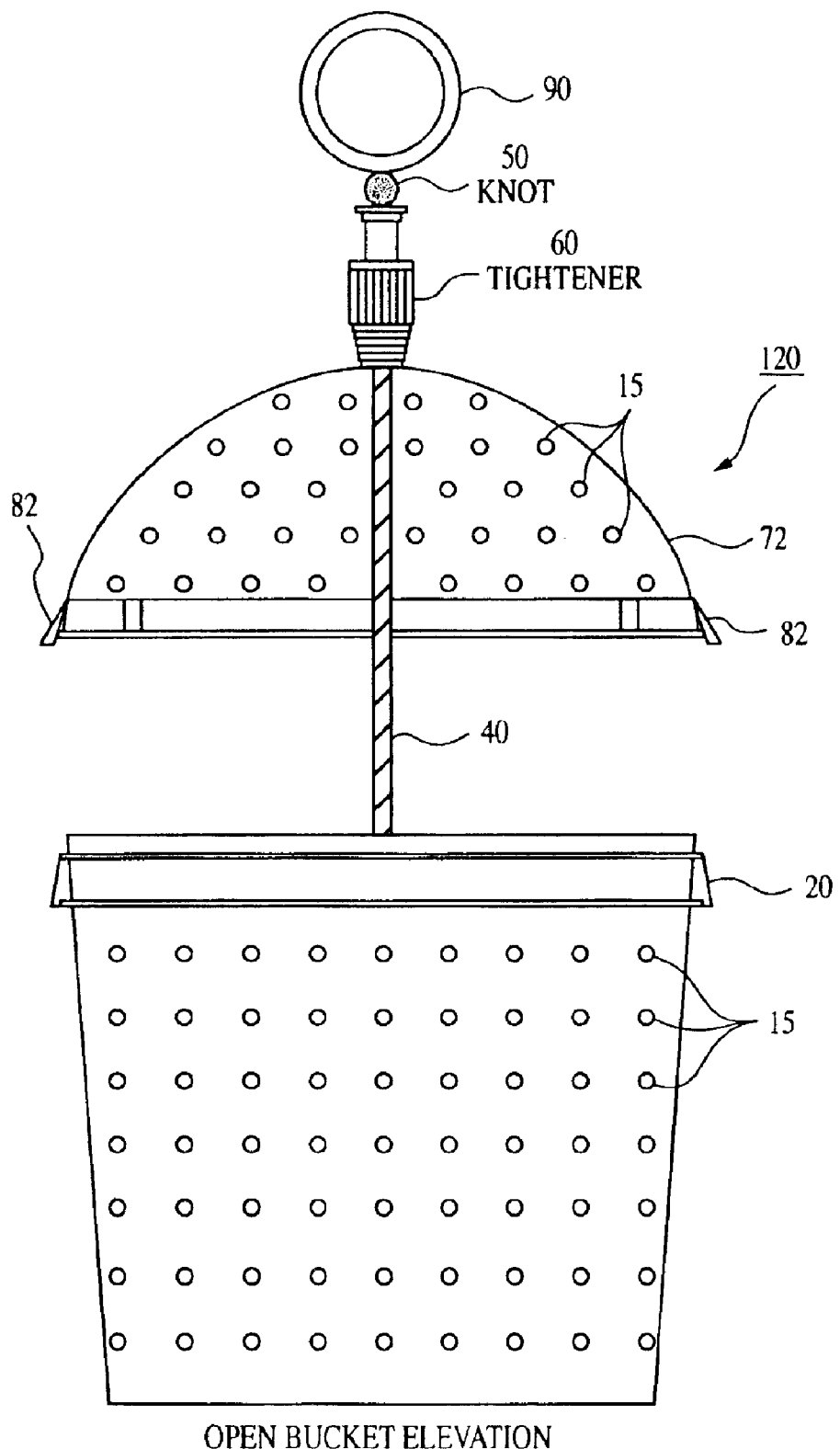
FIG. 7 is an elevation view of the chum pot of the embodiment of the present invention of FIG. 6 in the open position.

FIG. 7 illustrates an elevation view the embodiment of the present invention of FIG. 6 in the open (unsealed) position. As before, the travel or movement of the quick release tightener 60 and the lid 72 on the line 40 is limited by the knot or loop clasp or other fastening device 50. In the open position, the lowering line 40 facilitates user control over the lid 72 even during windy or rainy or snowy conditions suitable for sport fishing. Again, the quick release feature of the tightener 60 permits the user to quickly raise the lid 72 and replenish the supply of chum or bait inside the chum pot 120, and once this is accomplished, the user can simply reposition and seal the lid 72 back over the rim 20.

Figure 8:
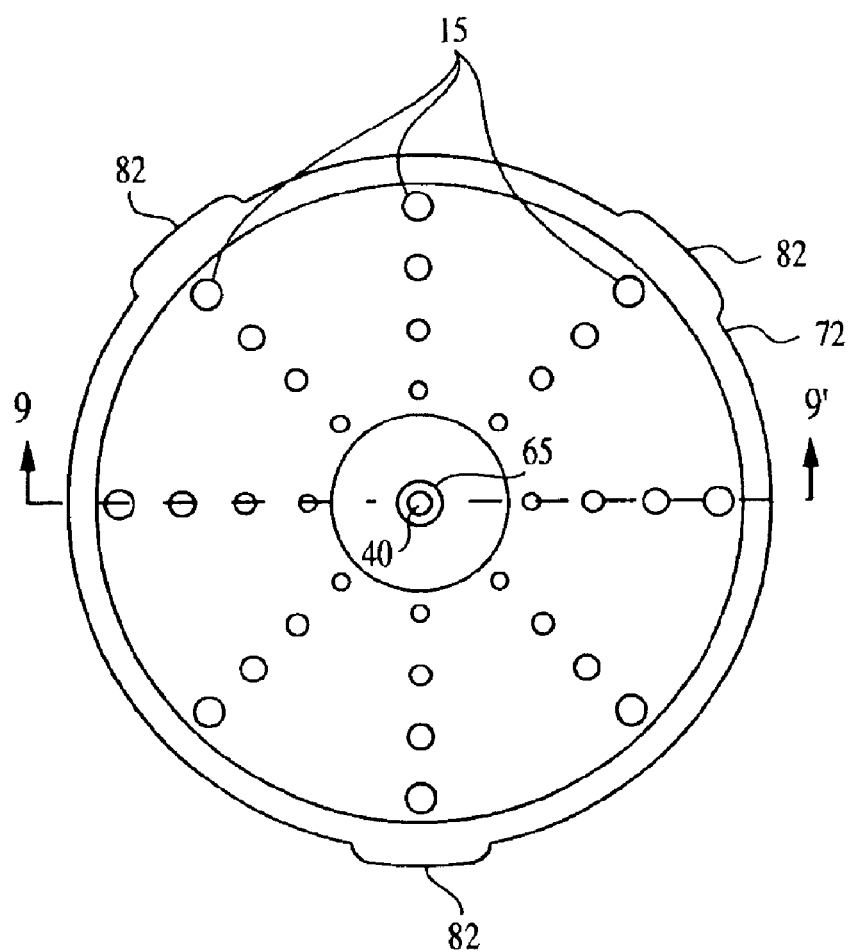
FIG. 8 is a plan view of the chum pot of the embodiment of the present invention of FIG. 6.

FIG. 8 illustrates a plan view of the chum pot 120. Preferably at the upper center of the lid 72 is positioned the sleeve 65 through which the lowering line 40 passes. As before, the sleeve 65 prevents lateral motion and reduces degradation of the lowering line 40 and also reduces the frictional resistance as the lid 72 is raised and lowered on the lowering line 40.

Figure 9:
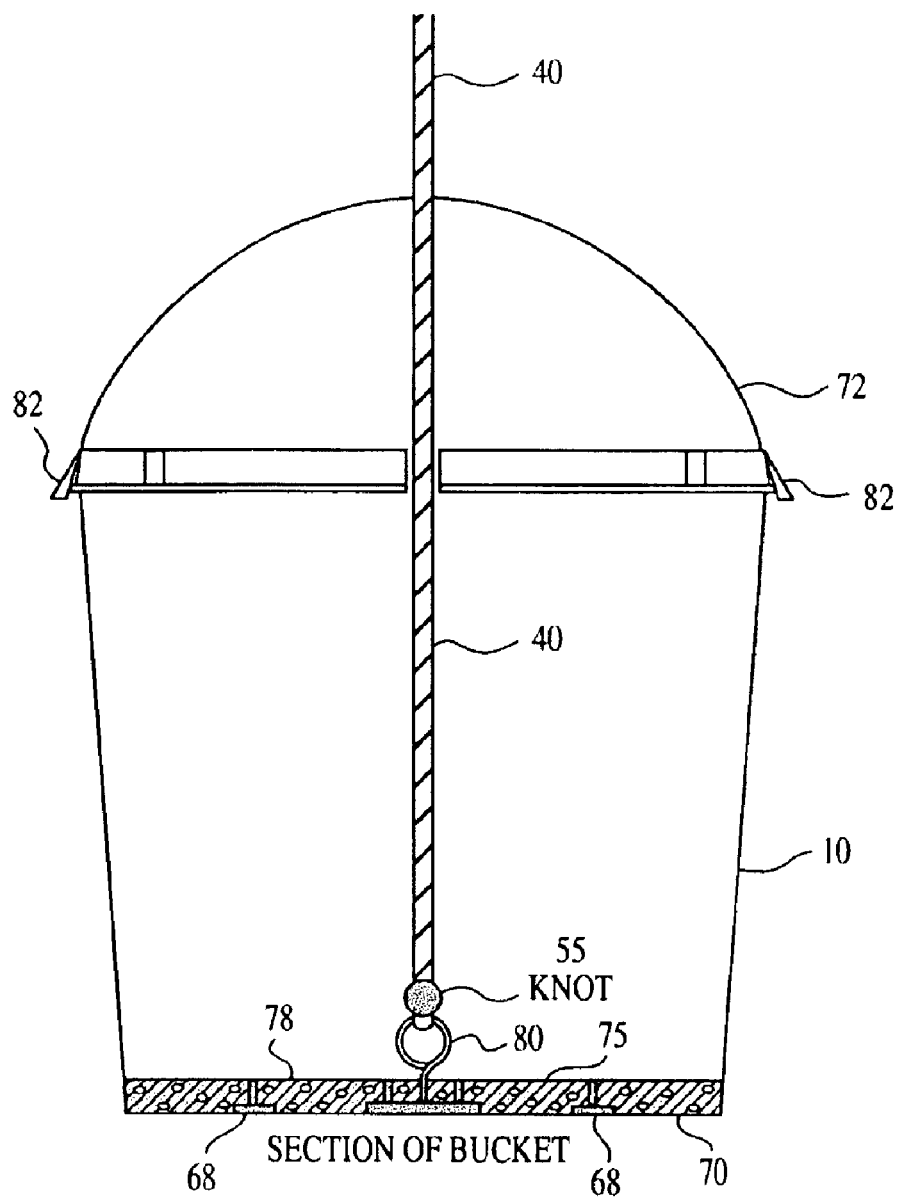
FIG. 9 is a cross-sectional view of the embodiment of the present invention along section 9–9' of FIG. 8.

FIG. 9 illustrates a cross-sectional view of the chum pot 120 along section line 9–9' of FIG. 8. As before, anchor bolts 68 are positioned through the lower surface 70 of the bucket 10 into a weighting material 75 which preferably is provided and is positioned at least partially if not entirely over eye-bolt anchor 80. The weighting material 75 holds the eye-bolt anchor 80 in place in a rigid manner. The line 40 is fastened to the eye of the eye-bolt anchor 80 by a second knot or loop clasp or other fastening device 55 so that the eye-bolt anchor 80 acts as an anchoring point for the line 40. When in use, the chum or bait is placed on the upper surface 78 of the weighting material 75 for dispersal through the perforations 15 in FIG. 6 and FIG. 7.

Although not shown separately, those skilled in the art recognize that the curvilinear lid 72 and optional locking tabs 82 can be combined the bucket 10 in the alternate embodiment shown in FIG. 5 to replace the lid 30.

The invention has now been explained with reference to specific embodiments. Other embodiments will be apparent to those of ordinary skill in the art in view of the foregoing description. It is not intended that this invention be limited except as indicated by the appended claims and their full scope equivalents.

What is claimed is:

1. A chum delivery container comprising:

a containment member, said containment member including a base and a surrounding wall surface, said base and said surrounding wall surface therein defining an open interior chamber and an open upper surface, said surrounding wall surface including a plurality of perforations therein permitting release of the chum from said open interior chamber;

anchoring means disposed at said base within said open interior chamber;

lowering means for lowering said chum delivery container to an underlying surface at a location, said lowering means being operatively connected to said anchoring means;

sealing and unsealing means for sealing and unsealing said open upper surface of said containment member, said lowering means penetrating through said sealing and unsealing means, said lowering means including a locking means for locking in position said sealing means for sealing said open upper surface of said containment member, said locking means permitting both sealing and unsealing of said containment member, said locking means capable of movement on said lowering means.

2. The chum delivery container of claim 1, wherein said containment member further comprises a weighting material disposed at said base.

3. The chum delivery container of claim 2, wherein said weighting material at least partially surrounds said anchoring means, except a portion of said anchoring means at which said lowering means is operatively connected to said anchoring means.

4. The chum delivery container of claim 2, wherein said anchoring means is at least partially surrounded by said weighting material, and said anchoring means is substantially exposed to said interior region of said containment member.

5. The chum delivery container of claim 1, wherein said locking means is capable of being unlocked in a single action.

6. The chum delivery container of claim 1, wherein said lowering means further comprises a limiting means for limiting movement of said sealing and unsealing means and said locking means on said lowering means.

7. The chum delivery container of claim 1, wherein said containment member is substantially cylindrical.

8. The chum delivery container of claim 2, wherein said weighting material is comprised of concrete.

9. The chum delivery container of claim 8, wherein said concrete is comprised of Portland cement.

10. The chum delivery container of claim 1, wherein at least one of said containment member and said sealing and unsealing means is comprised of a plastic material.

11. The chum delivery container of claim 10, wherein said plastic material is comprised of high-density polyethylene.

12. The chum delivery container of claim 1, wherein at least one of said containment member and said sealing and unsealing means is comprised of a luminescent material.

13. The chum delivery container of claim 12, wherein said luminescent material is comprised of a phosphorescent material.

14. The chum delivery container of claim 13, wherein said phosphorescent material is comprised of cadmium-zinc sulfide.

15. The chum delivery container of claim 12, wherein said luminescent material is comprised of a fluorescent material.

16. The chum delivery container of claim 1, wherein at least a portion of said sealing and unsealing means is of a curvilinear shape.

17. The chum delivery container of claim 16, wherein said sealing and unsealing means comprises at least one perforation.

18. The chum delivery container of claim 1, wherein said sealing and unsealing means comprises at least one locking tab which permits outward folding of said tab to seal and unseal said sealing and unsealing means to and from said open upper surface of said containment member.

19. The chum delivery container of claim 16, wherein said sealing and unsealing means comprises at least one locking tab which permits outward folding of said tab to seal and unseal said sealing and unsealing means to and from said open upper surface of said containment member.

20. A chum delivery container comprising:

a containment member, said containment member including a base and a surrounding wall surface, said base and said surrounding wall surface therein defining an open interior chamber and an open upper surface, said surrounding wall surface including a plurality of perforations therein permitting release of the chum from said open interior chamber;

lowering means for lowering said chum delivery container to an underlying surface at a location, said lowering means being operatively connected to an anchoring means for anchoring said lowering means to said containment member said anchoring means disposed at said base within said open interior chamber;

sealing and unsealing means for sealing and unsealing said open upper surface of said containment member, said lowering means penetrating through said sealing and unsealing means, said lowering means including a locking means for locking in position said sealing means for sealing said open upper surface of said containment member, said locking means permitting both sealing and unsealing of said containment member, said locking means capable of movement on said lowering means.

* * * * *